Dec. 9, 1941.   A. ALVERSON   2,265,505
COFFEE MAKING DEVICE
Filed March 21, 1941
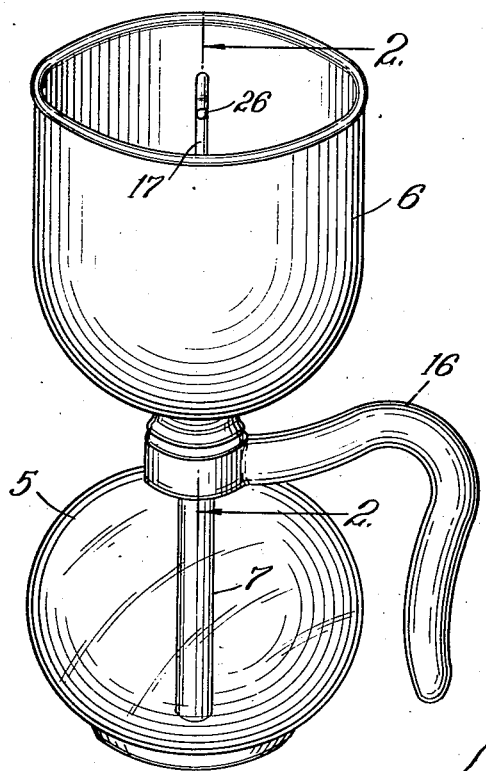
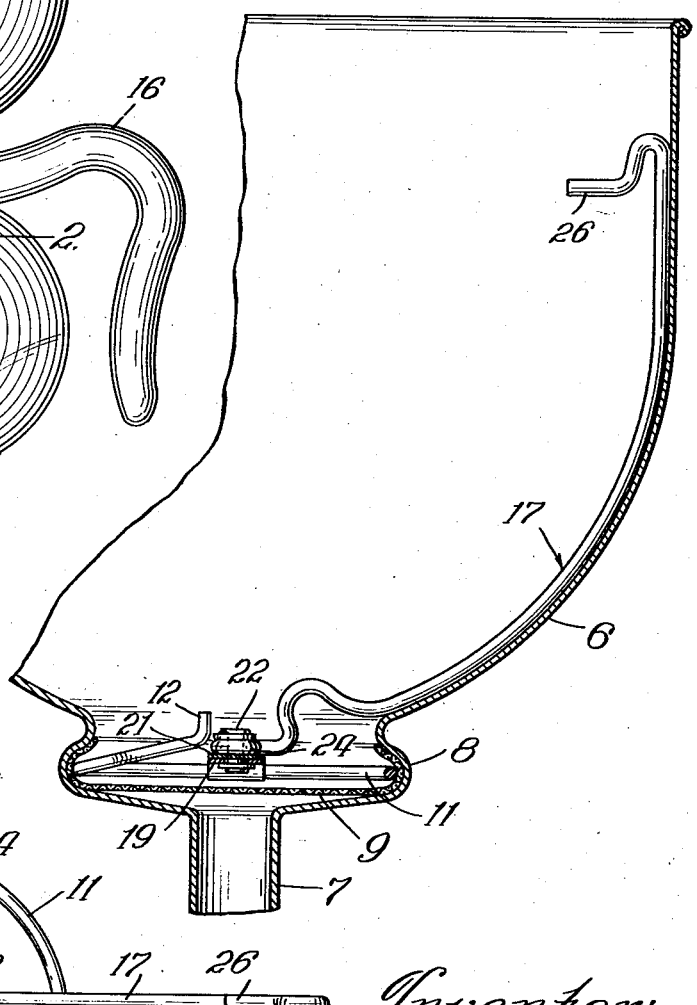
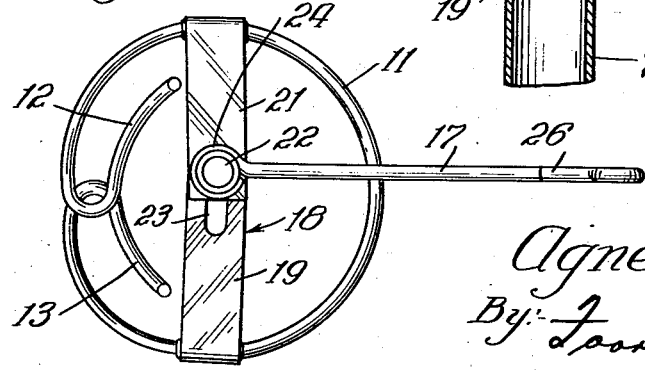
Inventor:
Agnes Alverson Patented Dec. 9, 1941

2,265,505

UNITED STATES PATENT OFFICE 2,265,505

COFFEE MAKING DEVICE

Agnes Alverson, Highwood, Ill.

Application March 21, 1941, Serial No. 384,533

4 Claims. (Cl. 53—3)

This invention relates generally to coffee making devices and in particular to a coffee making device of vacuum type.

In general the prior art coffee making devices of vacuum type include a bowl or lower portion and a top or upper portion supported on the bowl and having an extension or outlet drain extending downwardly therein. The water for the coffee on being heated in the lower bowl rises in said extension into the top portion where it is mixed with the coffee, which is usually in ground form. When the heat is removed from the bowl, the coffee from the top drains back into the bowl, a strainer in the outlet drain serving at all times to prevent any of the ground coffee from entering into the bowl. As the coffee drains from the top portion the coffee grounds tend to adhere or stick to the inside wall of the top portion, so that when the coffee is entirely drained, such inside wall surface is substantially entirely coated with coffee grounds. The coffee grounds are usually removed by scraping with the hands, or wiping with a wash cloth or the like. This procedure is rather inconvenient and is particularly objectionable where the coffee making device is used in restaurants or the like, since the person cleaning the top of the coffee maker is not available immediately afterward for waiting on any customers. That is, sufficient time must be permitted for the waiter to thoroughly wash his hands before he is ready for table service.

In those instances where the top of the coffee making device is composed of metal, removal of the coffee grounds therefrom is oftentimes accomplished by inverting the top and knocking its open side on some stationary object to shake the coffee grounds loose from such top portion. This manner of cleaning the top is objectionable since it results in leaving the top in a battered and dented condition to the extent that replacements thereof are frequently required. Since the top portion forms an appreciable part of the initial cost of the entire coffee making unit, it is readily apparent that this method of removing the coffee grounds is rather expensive.

It is an object of this invention, therefore, to provide an improved coffee making device of vacuum type.

It is a further object of this invention to provide improved means for removing the coffee grounds from the top portion of a coffee making device of vacuum type.

It is another object of this invention to provide means for removing the coffee grounds from a coffee making device of vacuum type, which is simple and rugged in construction, satisfactory in operation, and relatively inexpensive so that any replacements thereof can be made with a minimum of cost.

A particular feature of this invention is found in the provision of a coffee ground removing element which is assembled with the holder for the coffee strainer means and is adapted to be rotated within the top portion of the coffee making device and in slidable engagement with the inner wall thereof, so as to thoroughly remove all coffee grounds which might be adhering to such wall. Coffee grounds are thus entirely and simply removed without in any manner coming into contact with the hands or without defacing the top in any way.

Further objects, features and advantages of this invention will become apparent from the following description when taken in connection with the accompanying drawing in which:

Fig. 1 is a view in perspective of a coffee making device of vacuum type;

Fig. 2 is a fragmentary sectional view as seen along the line 2—2 in Fig. 1 showing the improved coffee ground remover of this invention; and Fig. 3 is a detail plan view of the invention.

Referring to the drawing, there is shown in Fig. 1 a coffee making device of vacuum type having a bottom bowl 5, with an upper bowl 6 supported thereon. The upper bowl 6 is open at the top and is provided at its bottom with an integrally formed outlet or drain 7 which is arranged substantially centrally of said bottom and extends within the lower bowl. The inner end of the outlet or drain 7 is provided with an annular recess or groove 8 adapted to receive therein a filter or strainer 9, which is retained within the recess 8 by a spring holder 11 of substantially circular form. The holder 11 (Figs. 2 and 3) is composed of wire and is formed with overlapping bent end portions 12 and 13, the extreme ends of which extend upwardly so as to be conveniently gripped by the hand for squeezing together. On squeezing of the ends 12 and 13 toward each other, the wire holder 11 is sprung sufficiently for positioning within the recess 8. Upon release of the ends 12 and 13, therefore, the strainer 9 is positively held in its operating position as is clearly shown in Fig. 2.

In making coffee in a device of this type, the bowl 5 is initially filled with water, this water on becoming heated passing upwardly through the extension 7 and into the upper bowl 6. The coffee to be mixed with this water is placed in the bowl 6 and is usually of a ground form. When substantially all of the water from the bowl 5 has passed into the bowl 6, the heat is removed from the bowl 5 and the water, now coffee, returns into the bowl 5, and is served directly therefrom, a handle for the bowl 5 being indicated as 16.

With practically all of the water from the bowl 5 being at one time in the bowl 6, the coffee grounds in the bowl 6 may be lifted a considerable distance upwardly on the inside wall of the bowl 6. On recession of the coffee from the bowl 6 these coffee grounds tend to adhere to the inner surface of the bowl 6 so that on completion of the draining the inner wall of the bowl 6 is substantially completely covered with a coating of coffee grounds. As was previously mentioned, the coffee grounds remaining in the upper bowl are usually removed by a scraping action of the hands, or by gripping the bowl portion at the extension 7 and striking it against a stationary object while holding it in an inverted position. The disadvantages and objections of removing the coffee grounds in this way are completely eliminated in the present invention by the provision of a coffee ground removing element 17 of wire form (Figs. 2 and 3).

The element 17 is formed of wire and of a shape corresponding to the contour of the inside wall of the upper bowl 6. Supporting of the element 17 within the upper bowl 6 is accomplished by means including a bracket unit 18 extending across the holder 11 and including a pair of separable portions 19 and 21 formed of sheet metal and connected at their outer ends to the holder 11 by soldering or like means. The inner ends of the portions 19 and 21 are connected together for relative slidable movement by a pin or axis means 22, extended through the portion 21 and positioned in a slot 23 formed in the portion 19. The pin 22 is arranged at substantially the circular center of the holder 11 so that with the holder in position within the recess 8 the pin is located substantially centrally of the bottom of the bowl 6. The relative slidable movement of the inner ends of the portions 19 and 21 permits the holder 11 to be freely sprung, the position of the pin 22 in the portion 21 centrally positioning the pin when the holder 11 is in its filter holding position.

As is clearly shown in Fig. 3 the lower end 24 of the element 17 is of substantially eyelet form adapted to receive therein the axis means 22. The element 17 is thus supported across the wire holder 11 on the portions 19 and 21. It is obvious, of course, that the portion 21 can be made sufficiently rigid to alone support the element 17 and eliminate the portion 19. By virtue of the rotatable support of the element 17 at its end 24, and the positioning of the pin 22 substantially centrally of the bottom of the bowl 6, the element 17 on rotation thereof within the bowl 6 slidably engages substantially all portions of the inside wall thereof, this slidable engagement serving to remove from the wall any coffee grounds adhering thereto. The rotation of the element 17 is facilitated by the forming of a handle portion 26 at its upper end, the portion 26 extending inwardly of the bowl 6 and being of a length to be conveniently gripped. Thus with the upper bowl 6 removed from the lower bowl 5 the coffee grounds in the upper bowl 6 are simply removed by holding the extension 7 in one hand and manipulating the scraper element 17 with the other, the coffee grounds removed by the element 17 dropping downwardly to the bottom of the bowl in a loose form. After the element 17 has been rotated through at least one complete revolution, the coffee grounds are readily disposed of by inverting or turning the bowl 6 upside down.

In coffee making devices of vacuum type, it is necessary to frequently replace the strainers or filters 9 and the spring holder 11. The replacement of the holders 11 is due to the loss of spring action therein resulting from its frequent bending or squeezing together. It is apparent, therefore, that when the spring holder 11 is no longer capable of retaining the strainer 9 tightly against the walls of the recess 8, that coffee grounds might enter the bowl 5. Because of the wire construction of the scraper element 17, and the forming of the bracket 18 from sheet or stamping metal, the entire assembly of the wire holder 11 and coffee ground remover 17 is relatively inexpensive so that replacements of the complete unit can be made at a very minimum of cost. It is to be understood, of course, that the outer ends of the separable portions 19 and 21 may be adapted to be clamped on the wire holder 11 so as to be releasably connected thereto. The wire holder 11 may thus be replaced independently of the element 17 and its supporting means.

Although the present invention has been illustrated and described with reference to only a specific embodiment thereof it is to be understood that it is not to be so limited, since alterations and modifications therein can be made which are within the full intended scope of this invention as defined by the appended claims.

I claim:

1. In a device for making coffee, including a bowl-shaped container in which water is mixed with ground coffee, said container having an outlet drain at the bottom thereof with an annular recess concentric therewith, the combination of means for removing the coffee grounds from the inside wall of said container on draining of the coffee therefrom through said outlet including a scraping element, strainer means at said outlet including a wire filter holder adapted to be sprung within said annular recess to retain said filter over said outlet, bracket means having a pair of separable portions extending across said filter holder with the outer ends of said portions being supported on said wire holder, with the inner end of one of said portions being formed with a slot, axis means extending through the inner end of the other of said separable portions and through said slot so that said portions are relatively movable when said wire holder is sprung inwardly, said scraper element being pivotally supported at one end on said axis means and extending upwardly therefrom in mating slidable engagement with said inside wall, with rotation of said element about said axis means scraping off any coffee grounds adhering to said inside wall.

2. In a device for making coffee including an open topped container in which water is mixed with ground coffee, said container having an outlet drain located substantially in the center of the bottom thereof, the combination of means for removing the coffee grounds from the inside wall of said container after the coffee has drained therefrom including a scraper element, strainer means at said drain including a wire strainer holder adapted to be sprung into a strainer holding position, said wire holder having overlapping end portions, bracket means including a pair of separable portions extending diametrically across said wire holder in a direction substantially parallel to the path of movement of said overlapping end portions, with the outer ends of said separable portions being supported on said wire holder, and the inner ends of said portions being connected together but relatively slidable, and axis means extending through said inner ends and pivotally supporting one end of said scraper element, with said scraper element extending upwardly in mating contour with said inside wall, said axis means being at the center of the bottom of said container when the wire holder is in a strainer holding position so that rotation of said element about said axis means serves to scrape off from said inside wall any coffee grounds adhering thereto.

3. In a coffee making device including an open-topped container of substantially bowl shape having an outlet drain arranged substantially centrally in the bottom thereof, with the water for said coffee being mixed with ground coffee in said container, the combination of a scraper element for removing the coffee grounds from the inside wall of said container after the coffee has been drained from said container, means at said outlet including a wire strainer holder of substantially circular form adapted to be sprung into a strainer holding position at said outlet, a supporting member connected at one end to said wire holder, with its opposite end extending inwardly of said wire holder, and axis means provided near the inner end of said bracket member and arranged substantially at the circular center of said wire holder, said scraper element being rotatably supported at one end on said axis means and having a portion thereof extending upwardly in mating contour with the inside wall of said container, with said portion on rotation of said scraper element slidably engaging said inside wall to remove any coffee grounds from the same.

4. In a coffee making device having a top portion of substantially bowl shape in which the ground coffee is mixed with water, said top portion being formed with an outlet drain located substantially centrally in the bottom thereof having a strainer extending thereacross, the combination of an element for removing the coffee grounds from the inside wall of the top portion after the coffee has been drained therefrom, said element being formed of wire and shaped in correspondence with the contour of said inside wall, means rotatably supporting said element at one of its ends including a wire circular spring member for holding said strainer at said outlet, a bracket member connected at one end to said wire holder, with its other end extending inwardly thereof, and axis means on said bracket member at said inner end positioned substantially at the circular center of said wire holder, said one end of said element being of eyelet form for receiving said axis means, with its opposite end having a hand-gripping portion extending inwardly away from said inside wall, said element on rotation thereof about said axis means slidably engaging substantially all portions of said inside wall to remove any coffee grounds therefrom.

AGNES ALVERSON.